United States Patent
Kittl et al.

(10) Patent No.: US 6,831,967 B1
(45) Date of Patent: Dec. 14, 2004

(54) METHOD FOR BACKING UP CALL CHARGE DATA OF A TELEPHONE SWITCHING OFFICE

(75) Inventors: Herwig Kittl, Untersiebenbrunn (AT); Monika Valuch, Ebendorf (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,663

(22) PCT Filed: Sep. 1, 1999

(86) PCT No.: PCT/DE99/02735

§ 371 (c)(1),
(2), (4) Date: Mar. 7, 2001

(87) PCT Pub. No.: WO00/14637

PCT Pub. Date: Mar. 16, 2000

(30) Foreign Application Priority Data

Sep. 8, 1998 (DE) .......................... 198 40 975

(51) Int. Cl.[7] ............................................ H04M 15/00
(52) U.S. Cl. .............................. 379/114.03; 379/112.02; 379/126; 379/133
(58) Field of Search ....................... 379/114.01, 114.03, 379/112.02, 114.29, 126, 133; 707/204, 10; 711/100, 114, 4, 162; 360/97.03, 230.03, 48, 97.04

(56) References Cited

U.S. PATENT DOCUMENTS

| 5,573,381 A | * | 11/1996 | Pane et al. ................... 417/284 |
| 5,673,381 A | * | 9/1997 | Huai et al. ...................... 714/1 |
| 5,907,603 A | * | 5/1999 | Gallagher et al. .......... 379/133 |
| 5,937,428 A | * | 8/1999 | Jantz .......................... 711/114 |
| 6,012,124 A | * | 1/2000 | Kamo et al. ................. 711/114 |

* cited by examiner

Primary Examiner—Curtis Kuntz
Assistant Examiner—Barry W Taylor
(74) Attorney, Agent, or Firm—Bell Boyd & Lloyd LLC

(57) ABSTRACT

A method for backing up call charge data, stored in a disk storage, of a telephone switching office, in which individual data blocks are read by the disk storage and transmitted, with write orders, to two sequential mass storages, for example magnetic tape storages, which are independent of one another. In this process, in each case a data block read by the disk storage is transmitted, together with a write order, both to the first and to the second or a further mass storage, and after an acknowledgment is received both by the first mass storage and by the second mass storage, the next data block read by the disk storage is transmitted, together with write orders, to both mass storages.

5 Claims, 1 Drawing Sheet

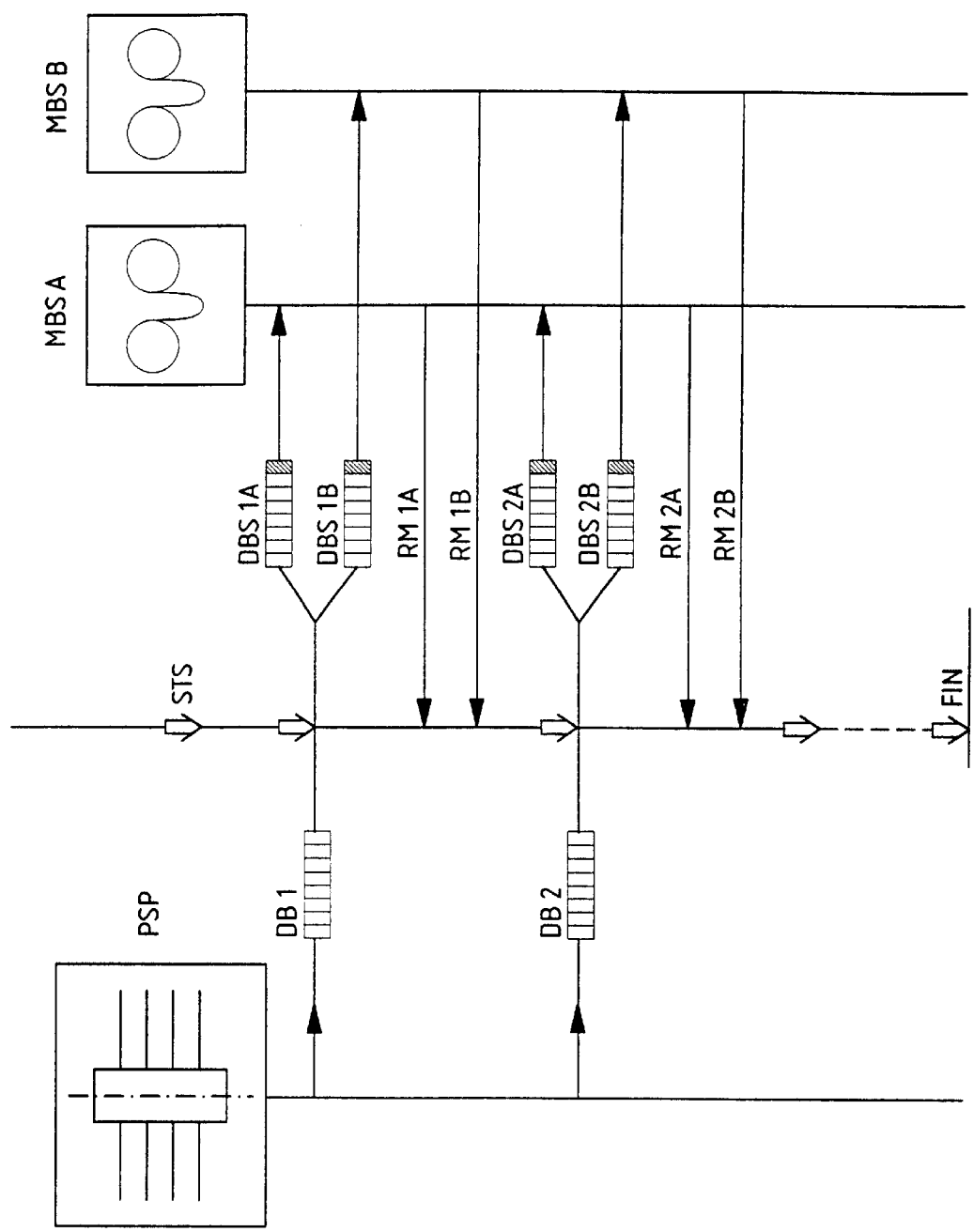

METHOD FOR BACKING UP CALL CHARGE DATA OF A TELEPHONE SWITCHING OFFICE

BACKGROUND OF THE INVENTION

1. Field of the Invention

The present invention relates to a method for backing up call charge data, stored in a disk storage, of a telephone switching office, in which individual data blocks are read by the disk storage and transmitted, with write orders, to two sequential mass storages which are independent of one another.

2. Description of the Prior Art

In large telephone switching offices with a large number of subscriber lines, considerable quantities of call charge data are generated; typically, far in excess of 100 Mbyte per day. Because the call charge information has to be further processed quickly in order to be able to bill customers at any time, and because the call charge data has considerable financial importance, it is necessary to store the data periodically on a sequential mass storage; in particular, a tape storage. For security reasons, when this is done the call charge data must be backed up on two tape storages which are independent of one another so that there are, ultimately two copies of the call charge data available.

In order to store call charge data, the current procedure is to first to produce a tape copy of the data which may even consist of a number of tapes, and, after this first backing-up operation has been terminated, a second backup copy of the call charge data of the hard disk is generated on a second tape device.

Because of the abovementioned large quantities of data, the time required to produce a backup copy is in the order of magnitude of hours, often up to ten hours. In addition, of course, the same amount of time is required once more to produce the second backup copy. In view of the fact that backing up is desired or required daily or twice daily, the limits of feasibility is reached. Because the call charge data are usually extracted from a cyclical file, there is the risk of call charge data being lost through overwriting during the long copying times.

An object of the present invention, therefore, is to remedy the abovementioned problems which, to a certain extent, have their origin in the fact that a telephone switching office is a real-time system with a high amount of data flow.

SUMMARY OF THE INVENTION

Accordingly, the present invention is directed to a method wherein in each case a data block read by the disk storage is transmitted, together with a write order, both to the first mass storage and to the second or a further mass storage, and after an acknowledgment is received both by the first mass storage and by the second mass storage, the next data block read by the disk storage is transmitted, together with write orders, to both mass storages.

The present invention provides, inter alia, the advantage that the data only has to be read one single time from the hard disk, with the result that the system is considerably relieved as a result of the corresponding reduction in disk access operations. Because the two mass storages, for example tape devices, can execute the write order independently of one another, yet simultaneously, it is not necessary to wait twice for the individual write orders to be terminated. Overall, it is possible to produce two identical backup copies with significantly reduced expenditure in terms of the system and in terms of time. That is, a reduction by almost half can be achieved here.

In order to reduce the time requirements, it is also preferred if the write orders are transmitted simultaneously with the data blocks to both mass storages.

In order to permit backing up of data even when a mass storage is faulty, it is possible to provide that when there is a fault message from one of the two mass storages which is faulty, the individual data blocks are successfully transmitted, with the write orders, to the non-faulty mass storage.

Additional features and advantages of the present invention are described in, and will be apparent from, the following Detailed Description of the Preferred Embodiments and the Drawings.

DESCRIPTION OF THE DRAWINGS

FIG. 1 shows, in a single schematic view, the method of the present of producing two backup copies of the call charge data of a telephone switching office, wherein the data is present on a disk storage.

DETAILED DESCRIPTION OF THE PREFERRED EMBODIMENTS

A disk storage PSP and two magnetic tape storages MBS A, MBS B are shown as sequential mass storages in schematic views in FIG. 1. The storages are located in or at a telephone switching office (not shown in more detail) with a large number of subscriber lines, with large quantities of call charge data being generated. The call charge data, often more than 100 Mbyte per day, is written into a disk storage (hard disk) and is present there in data blocks of, for example, 14 kbyte in length.

The present invention provides that, in order to produce two backup copies of the call charge data on tape, the copying process is started in response to a starting signal STS, and a first data block DB 1 is read by the disk storage PSP. This data block is provided with a write order for the first magnetic tape storage MBS A, or a write order for second magnetic disk storage MBS B, and transmitted in data blocks DBS 1A, DBS 1B to the magnetic tape storages MBS A, MBS B. After the write orders are executed, acknowledgments RM 1A, RM 1B are issued by the tape storages, the acknowledgments RM 1A, RM 1B having the effect that, to protect the next (second) data block DB 2, the data block DB 2 is read out of the disk storage PSP, provided with write orders and transmitted in the form of data blocks DBS 2A, DBS 2B to the tape storages MBS A, MBS B.

After storage has taken place, acknowledgments RM 2A, RM 2B are issued and the backup procedure of a third data block begins. This continues on until all the data blocks have been processed, and finally a signal FIN indicates the end of the procedure.

The write orders with the data blocks, i.e. the data blocks DBS 1A, DBS 1B, etc. a are expediently always transmitted simultaneously to both tape storages MBS A, MBS B. This does not mean, however, that the acknowledgments RM 1A, RM 1B, etc. also must be issued simultaneously or in a specific sequence because the time period for storage on the tape devices can vary as a matter of principle.

However, if an acknowledgment from one of the two tape storages is not received within a reasonable time period, it is necessary to make a decision about the rest of the method cycle, for example, to the effect that a renewed attempt is made to store the corresponding data block or that the system simply moves onto the next data block.

However, if a serious fault is detected in one of the two tape storages MBS A, MBS B, a fault message is emitted and the method is executed with the non-faulty tape storage alone in order to obtain a single backup copy in this case. On the other hand, if one of the two tape storages is faulty, a third magnetic tape storage kept in reserve may be resorted to, which tape storage then takes the place of the faulty device.

Although the present invention has been described in relation to magnetic tape storages, other sequential mass storages, or mass storages which behave in sequential fashion, such as storages with a magneto-optical disks, for example, are also possible.

In the manner described, it is possible to produce two backup copies of a call charge data record with a large quantity of data without excessively loading the system. At the same time, the number of disk access operations which is reduced, virtually by half, proves very advantageous. The production of backup copies twice daily, as often required, is thus also possible in large telephone switching offices. The present invention is, of course, not restricted to the production of merely two copies, because in particular applications, even three or more copies may be required.

Although the present inventionhas been described with reference to specific embodiments, those of skill in the art will recognize the changes may be made thereto without departing from the spirit and scope of the invention as set forth in the hereafter appended claims.

We claim:

1. A method for producing two back up copies of call charge data, stored in a disk storage, of a telephone switching office, the method comprising the steps of:

reading a first individual data block only a single time from the disk storage;

transmitting the first individual data block that is read only a single time, together with a write order, simultaneously to both a first mass storage and to a second mass storage;

receiving an acknowledgement by both the first and second mass storages;

reading a next data block only a single time from the disk storage; and transmitting the next data block, together with a write order, to both the first and second mass storages after receipt of the acknowledgment, and repeating the procedure of reading the next data block only a single time and transmitting the next data block, together with a write order, simultaneously to both the first and second mass storages, until the the two backup copies are produced.

2. A method for backing up call charge data, stored in a disk storage, of a telephone switching office in claim 1, wherein the write orders are transmitted to the first and second mass storages simultaneously with the first and next data blocks.

3. A method for backing up call charge data, stored in a disk storage, of a telephone switching office as claimed in claim 1, the method further comprising the steps of:

determining when a fault message is present at one of the first and second mass storages which is faulty; and transmitting the individual data blocks successively, with the write orders, to the other of the first and second mass storages which is not faulty.

4. A method for backing up call charge data, stored in a disk storage, of a telephone switching office as claimed in claim 1, wherein the first and second mass storages are magnetic tape storages.

5. A method for backing up call charge data as claimed in claim 1, further comprising the step of writing simultaneously the data blocks to the first and second mass storages.

* * * * *